(12) United States Patent
Han

(10) Patent No.: US 12,250,961 B2
(45) Date of Patent: Mar. 18, 2025

(54) APPARATUS FOR MANUFACTURING SCORCHED RICE

(71) Applicant: Sung Man Han, Ansan-si (KR)

(72) Inventor: Sung Man Han, Ansan-si (KR)

(73) Assignees: Sung Man Han, Ansan-si (KR); Eon Kyu Shim, Yongin-si (KR)

( * ) Notice: Subject to any disclaimer, the term of this patent is extended or adjusted under 35 U.S.C. 154(b) by 778 days.

(21) Appl. No.: 17/602,265

(22) PCT Filed: Apr. 10, 2020

(86) PCT No.: PCT/KR2020/004878
§ 371 (c)(1),
(2) Date: Oct. 7, 2021

(87) PCT Pub. No.: WO2020/209660
PCT Pub. Date: Oct. 15, 2020

(65) Prior Publication Data
US 2022/0160016 A1 May 26, 2022

(30) Foreign Application Priority Data
Apr. 10, 2019 (KR) .......................... 10-2019-0041725

(51) Int. Cl.
*A23P 30/00* (2016.01)
*A21C 11/00* (2006.01)
*A47J 37/04* (2006.01)

(52) U.S. Cl.
CPC ............ *A23P 30/00* (2016.08); *A21C 11/008* (2013.01); *A47J 37/044* (2013.01); *A21C 11/006* (2013.01); *A47J 37/045* (2013.01)

(58) Field of Classification Search
CPC ...... A47J 37/045; A47J 37/044; A47J 37/047; A21C 11/006; A21C 11/008; A21C 15/02; A23P 30/00
USPC ........................... 99/349, 353, 443 C, 450.2
See application file for complete search history.

(56) References Cited

U.S. PATENT DOCUMENTS

| | | | | |
|---|---|---|---|---|
| 2,414,580 | A * | 1/1947 | Birdseye | F26B 17/023 34/208 |
| 4,096,791 | A * | 6/1978 | Weiss | A23L 19/19 99/403 |
| 4,241,648 | A * | 12/1980 | Longenecker | A21B 5/02 425/374 |
| 11,589,707 | B2 * | 2/2023 | Riggle | A47J 37/042 |

FOREIGN PATENT DOCUMENTS

| | | |
|---|---|---|
| KR | 10-2008-0002347 A | 1/2008 |
| KR | 10-0842364 B1 | 7/2008 |
| KR | 10-2011-0110888 A | 10/2011 |

(Continued)

*Primary Examiner* — Reginald Alexander
(74) *Attorney, Agent, or Firm* — Han's Law Office

(57) ABSTRACT

An apparatus for manufacturing scorched rice, the apparatus includes an ingredient supply unit for supplying a scorched rice ingredient; a rotatable scorched rice formation unit which forms scorched rice and to which the scorched rice ingredient supplied from the ingredient supply unit is adhered; a heat supply unit for supplying heat to the scorched rice formation unit so that the scorched rice is formed; and a scorched rice separation unit for separating the scorched rice formed by the scorched rice formation unit.

8 Claims, 4 Drawing Sheets

(56) References Cited

FOREIGN PATENT DOCUMENTS

| KR | 10-1686502 B1 | 12/2016 |
| KR | 10-2018-0041803 A | 4/2018 |
| KR | 10-1845062 B1 | 4/2018 |
| KR | 10-1848832 B1 | 4/2018 |
| KR | 10-1911181 B1 | 10/2018 |
| KR | 10-1921620 B1 | 2/2019 |

* cited by examiner

APPARATUS FOR MANUFACTURING SCORCHED RICE

CROSS-REFERENCE TO PRIOR APPLICATIONS

This application is a national Stage Patent Application of PCT International Patent Application No. PCT/KR2020/004878, filed on Apr. 10, 2020 under 35 U.S.C. § 371, which claims priority of Korean Patent Application No. 10-2019-0041725, filed on Apr. 10, 2019, which are all hereby incorporated by reference in their entirety.

TECHNICAL FIELD

The present invention relates to an apparatus for manufacturing scorched rice and, more specifically, to an apparatus for manufacturing scorched rice, which is capable of rapidly manufacturing scorched rice in large quantities through an unmanned automatic and continuous process, reducing labor costs, and efficiently manufacturing high-quality scorched rice.

BACKGROUND ART

Generally, scorched rice is formed by sticking to the bottom of a rice cooker when cooking. Scorched rice has a savory taste and is highly nutritious. Scorched rice is associated with the simple eating habits of modern people and the consumption thereof is increasing as a snack as well as a meal substitute as it is. Scorched rice is favored by patients who have to eat porridge or people who have no appetite, and the consumption thereof is rapidly increasing in hospitals and other places.

Accordingly, methods for increasing the production of scorched rice have been proposed. In order to increase the yield, scorched rice is mostly manufactured by first cooking a large amount of rice in a rice cooker, then placing an appropriate amount of rice on a heated iron plate and allowing same to stick for a certain period of time. Recently, for mass production, scorched rice manufacturing equipment using upper/lower plate molds or using conveyors and heating plates has been developed and used. Such a scorched rice manufacturing apparatus is also presented in patent literatures.

For example, the technologies related to the above are suggested in Korean Patent Publication No. 10-1686502, Korean Patent Publication No. 10-1180273, Korean Patent Publication No. 10-1921620, Korean Patent Publication No. 10-1848832, and Korean Patent Publication No. 10-2008-0002347, and so on.

However, most of conventional scorched rice manufacturing apparatuses are time-consuming and require manual operations. Accordingly, there are problems in that productivity is low and labor costs are high. In addition, a scorched rice manufacturing apparatus using a conveyor has high productivity, but is bulky and has a complicated configuration, occupying a large installation space and requiring high costs due to design and maintenance of the apparatus.

DESCRIPTION OF EMBODIMENTS

Technical Problem

The present invention provides an apparatus for manufacturing scorched rice, which enables rapid mass production of scorched rice, a reduction in labor costs, and the like, through an unmanned automatic and continuous process, requires less installation space, maintenance costs, and the like, with the compact configuration of the apparatus, and can efficiently manufacture high-quality scorched rice.

Solution to Problem

To achieve the objective, the present invention provides an apparatus for manufacturing scorched rice, the apparatus comprising:
- an ingredient supply unit for supplying a scorched rice ingredient;
- a scorched rice formation unit which forms scorched rice and to which the scorched rice ingredient supplied from the ingredient supply unit is adhered;
- a heat supply unit for supplying heat to the scorched rice formation unit so that the scorched rice is formed; and
- a scorched rice separation unit for separating the scorched rice formed by the scorched rice formation unit.

In addition, the scorched rice manufacturing apparatus according to the present invention may further include a heat transfer unit for applying heat to the scorched rice formation unit so that the scorched rice ingredient is adhered to the scorched rice formation unit.

The scorched rice formation unit is rotated. According to an embodiment, the scorched rice formation unit includes a continuously rotating belt-shaped endless band. Here, the belt-shaped endless band may have a surface roughness (Ra) of 0.1 μm to 2.0 μm. In addition, the heat supply unit may include a drum-type heat supply drum in which a heating element is installed.

According to an embodiment of the present invention, the heat supply drum has a multi-layer structure and comprises: a thermally conductive skin layer with which the belt-shaped endless band is in close contact; a thermal diffusion layer formed on the skin layer; a thermal barrier layer formed on the thermal diffusion layer; and a heating element embedded in the thermal diffusion layer.

In addition, the scorched rice manufacturing apparatus according to the present invention may further include a residue removal unit for removing residues remaining on the surface of the scorched rice formation unit after the scorched rice is separated in the scorched rice separation unit.

Advantageous Effects of Invention

According to the present invention, scorched rice can be manufactured through unmanned automation and continuous process, so that rapid mass production of scorched rice is enabled, and labor costs can be reduced.

In addition, according to the present invention, with a compact device configuration, the installation space and maintenance cost of the scorched rice manufacturing apparatus are small, high-quality scorched rice having a savory taste by appropriate carbonization can be manufactured, thereby efficiently manufacturing high-quality scorched rice.

MODE OF INVENTION

The term "and/or" as used in the present invention is used to mean including at least one or more of the components listed before and after. As used herein, the term "one or more" refers to one or a plurality of two or more. The terms "first", "second", "one side" and "the other side" used in the present invention are used to distinguish one component from another component, and each component is not limited thereby.

In addition, the terms "formed on", "formed above", "formed under", "installed on", "installed above" and "installed under", etc. used in the present invention do not mean that a layer is formed (installed) in direct contact with each other, but mean that other components are further formed (installed) between the components. For example, "formed on" and "installed on" may mean that a second component is directly in contact with a first component and is formed (installed), as well as the first component and the second component, and may also mean that a third component can be further formed (installed) between the elements.

According to a first aspect, the present invention provides an apparatus for manufacturing scorched rice, which can manufacture scorched rice in an automated and continuous process and an almost unmanned operation can be realized. In addition, according to a second aspect, the present invention provides a method for manufacturing scorched rice, which can efficiently manufacture high-quality scorched rice by using the scorched rice manufacturing apparatus.

Hereinafter, embodiments of the present invention will be described with reference to the accompanying drawings. The accompanying drawings illustrate exemplary embodiments of the present invention, which are provided merely to aid understanding of the present invention. In addition, in describing the embodiment of the present invention, detailed description of related well-known general-purpose functions and/or configurations will be omitted.

Figure 1:
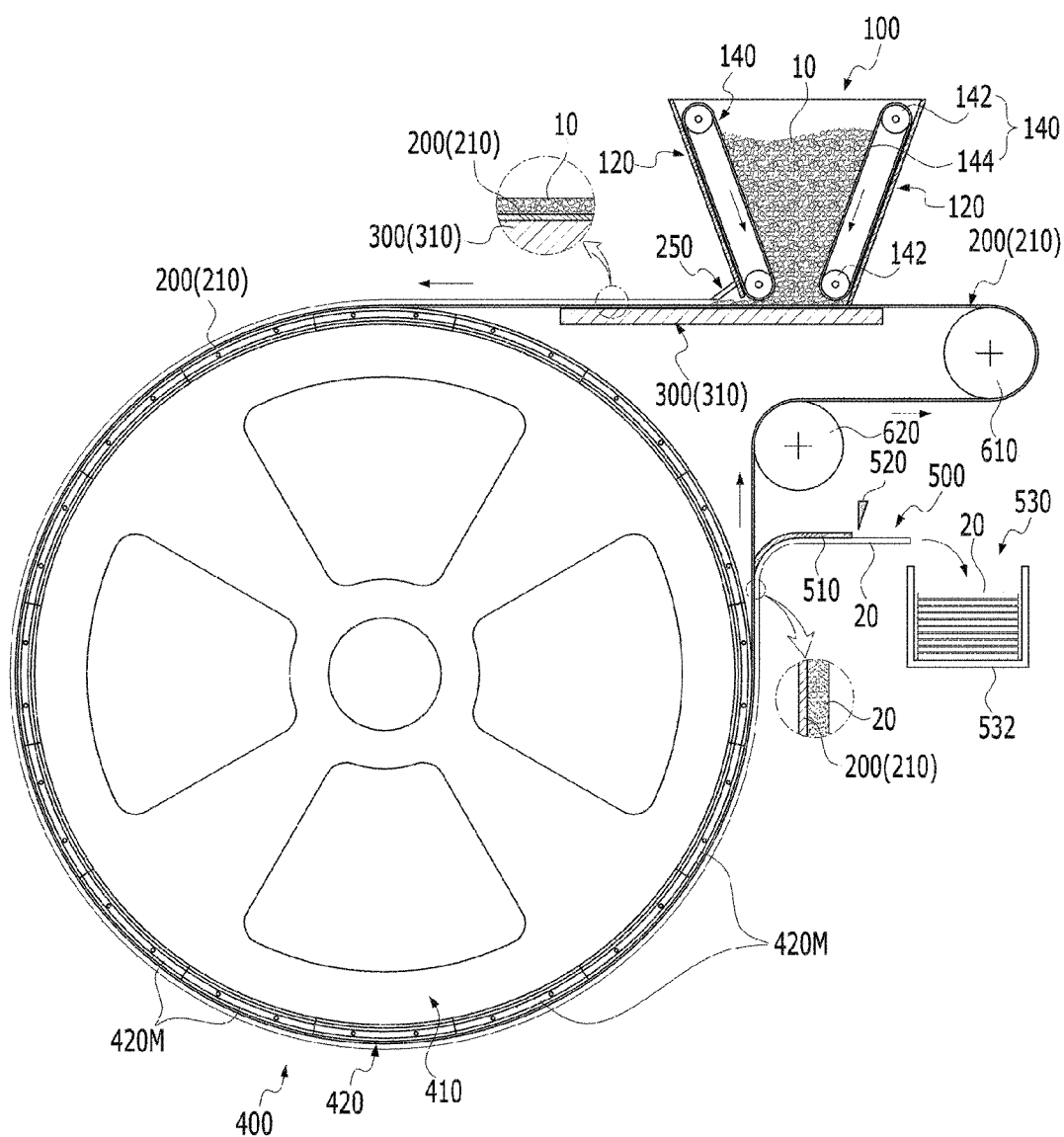
FIG. 1 is a cross-sectional diagram showing an apparatus for manufacturing scorched rice according to an embodiment of the present invention.
Figure 2:
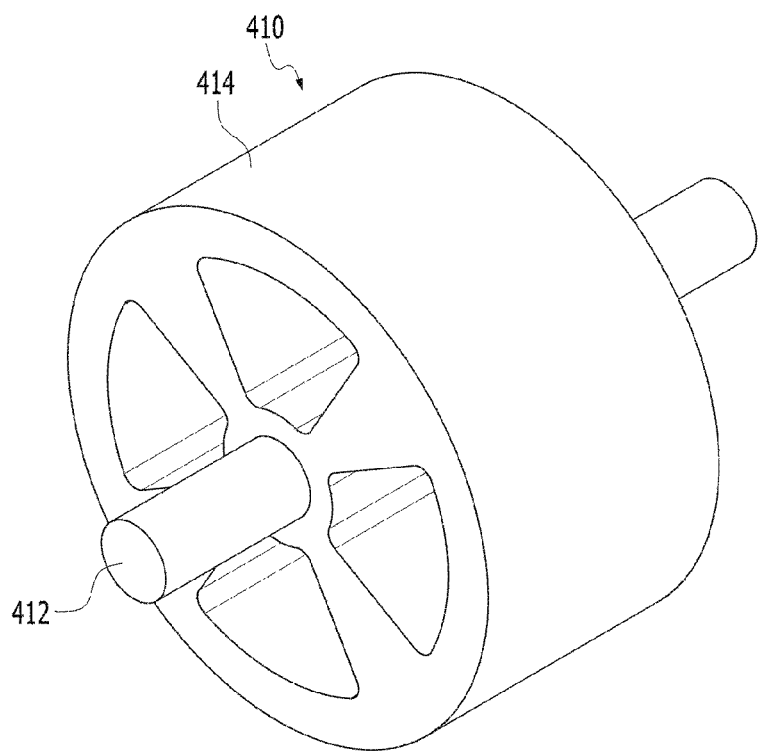
FIG. 2 is a perspective view showing a main part of an embodiment of a rotating drum constituting the apparatus for manufacturing scorched rice according to an embodiment of the present invention.
Figure 3:
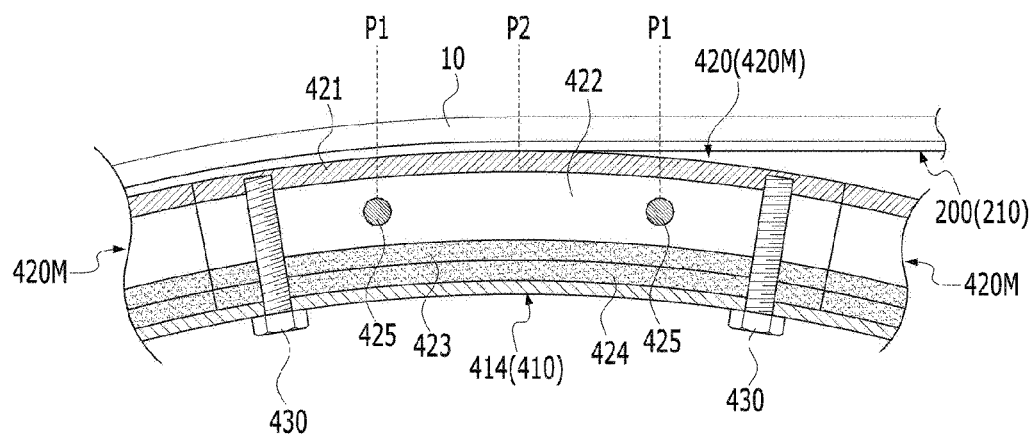
FIG. 3 is a sectional view showing a main part of a first embodiment of a heat supply drum constituting the apparatus for manufacturing scorched rice according to an embodiment of the present invention.
Figure 4:
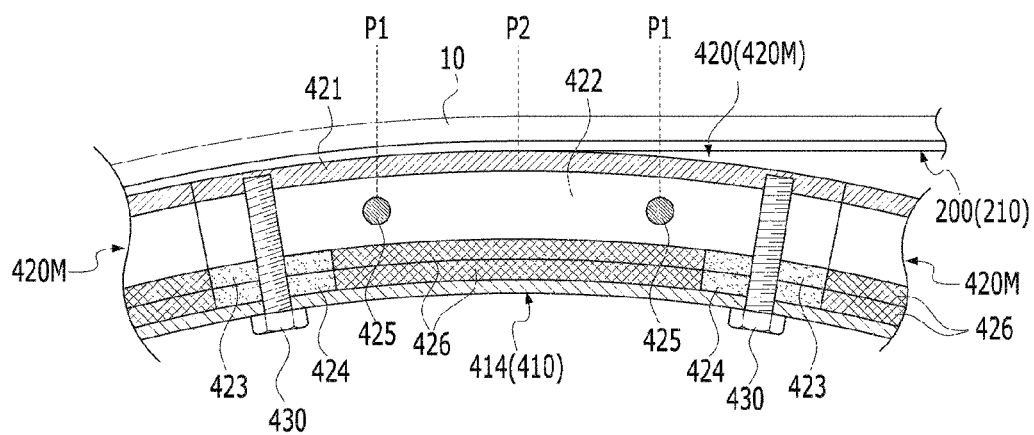
FIG. 4 is a sectional view showing a main part of a second embodiment of a heat supply drum constituting the apparatus for manufacturing scorched rice according to an embodiment of the present invention.
Figure 5:
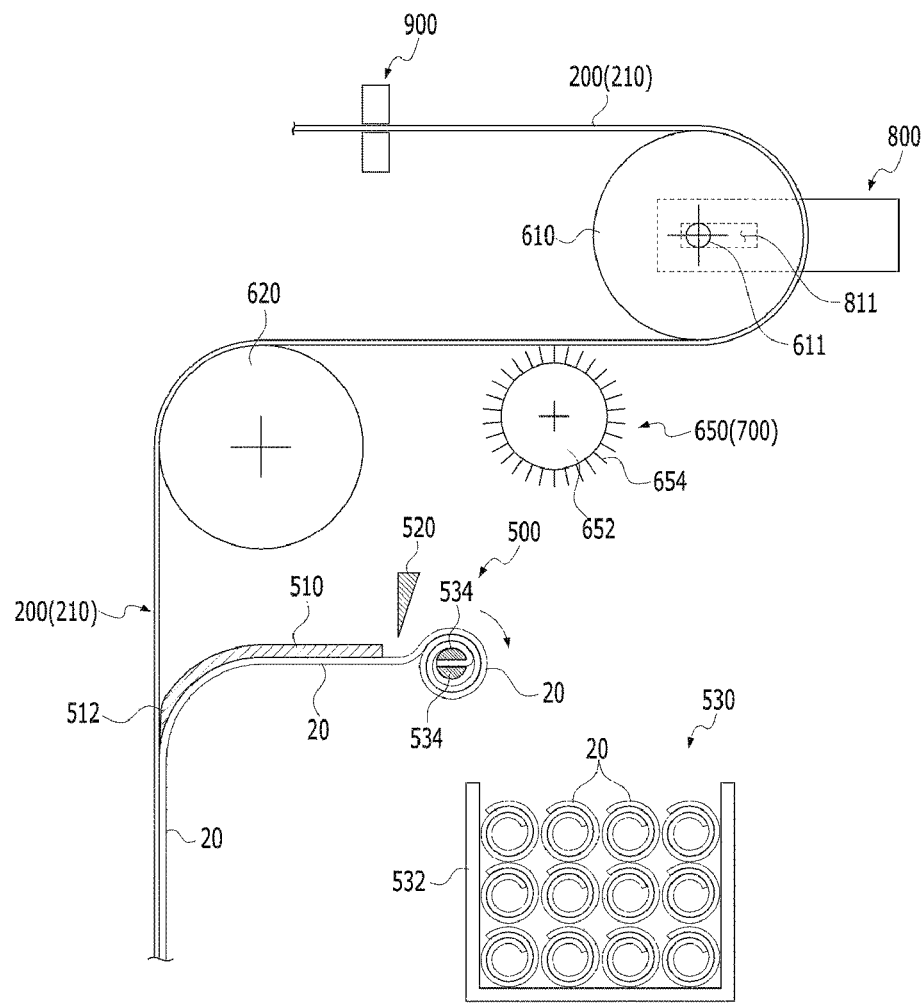
FIG. 5 is a sectional view showing a main part of an apparatus for manufacturing scorched rice according to another embodiment of the present invention.
Figure 6:
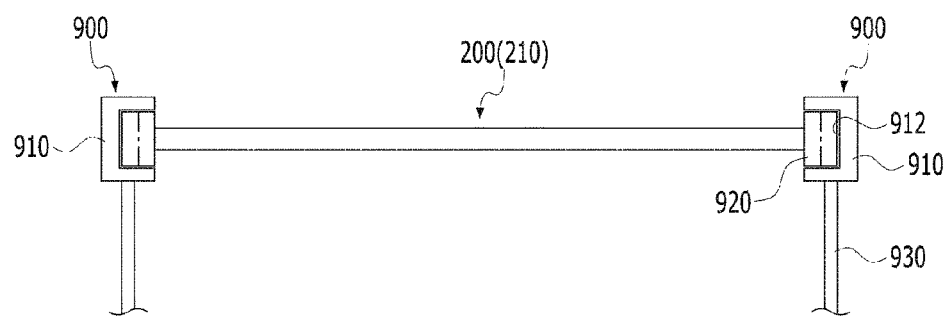
FIG. 6 is a sectional view showing a main part of an apparatus for manufacturing scorched rice according to still another embodiment of the present invention.

FIG. 1 is a cross-sectional diagram showing an apparatus for manufacturing scorched rice according to an embodiment of the present invention, and FIG. 2 is a perspective view showing a main part of an embodiment of a rotating drum constituting the apparatus for manufacturing scorched rice according to an embodiment of the present invention. FIG. 3 is a sectional view showing a main part of a first embodiment of a heat supply drum constituting the apparatus for manufacturing scorched rice according to an embodiment of the present invention, and FIG. 4 is a sectional view showing a main part of a second embodiment of a heat supply drum constituting the apparatus for manufacturing scorched rice according to an embodiment of the present invention. FIG. 5 is a sectional view showing a main part of an apparatus for manufacturing scorched rice according to another embodiment of the present invention, and FIG. 6 is a sectional view showing a main part of an apparatus for manufacturing scorched rice according to still another embodiment of the present invention.

First, referring to FIGS. 1 and 2, the scorched rice manufacturing apparatus according to the present invention includes: an ingredient supply unit 100 for supplying a scorched rice ingredient 10; a scorched rice formation unit 200 to which scorched rice ingredient 10 supplied from the ingredient supply unit 100 is adhered to form scorched rice 20; a heat supply unit 400 for supplying heat to the scorched rice formation unit 200 to form the scorched rice 20; and a scorched rice separation unit 500 for separating the scorched rice 20 formed in the scorched rice formation unit 200.

The scorched rice formation unit 200 is rotated. According to one embodiment, the heat supply unit 400 is continuously rotated, and the scorched rice formation unit 200 is continuously rotated along the heat supply drum 420. According to a preferred embodiment of the present invention, the heat supply unit 400 may include the heat supply drum 420 as a rotating body, and the scorched rice formation unit 200 may be formed on the outer surface of the heat supply drum 420. Here, the heat supply drum 420 is of a drum type, which is continuously rotated during the formation of the scorched rice 20. Accordingly, the scorched rice formation unit 200 is continuously rotated along the heat supply drum 420.

In addition, the scorched rice manufacturing apparatus according to the present invention may further include a heat transfer unit 300 for adhering the scorched rice ingredient 10 to the scorched rice formation unit 200 by applying heat to the scorched rice formation unit 200. Further, the scorched rice manufacturing apparatus according to the present invention may further include a first roller 610 installed at one side of the ingredient supply unit 100. According to a preferred embodiment of the present invention, the heat supply unit 400 includes a heat supply drum 420 of a drum type, the scorched rice formation unit 200 is a belt-shaped endless band 210 (endless band), and the belt-shaped endless band 210 is continuously rotated along the heat supply drum 420 and the first roller 610.

Referring to FIG. 1, the ingredient supply unit 100 continuously supplies the scorched rice ingredient 10 to the surface of the scorched rice formation unit 200. The scorched rice formation unit 200 includes a belt-shaped endless band 210, which is in close contact with the surface of the heat supply drum 420 and the first roller 610 and is continuously rotated to form the scorched rice 20. The scorched rice 20 formed in the scorched rice formation unit 200 is separated and collected by the scorched rice separation unit 500.

According to one embodiment, the present invention has technical significance in that a drum-type heat supply drum 420 is included as a rotating body, and the scorched rice formation unit 200 is continuously rotated along the drum-type heat supply drum 420, thereby continuously forming the scorched rice 20. According to a preferred embodiment of the present invention, the present invention has technical significance in that the scorched rice formation unit 200 is constituted by the belt-shaped endless band 210, and the belt-shaped endless band 210 is continuously rotated along the drum-type heat supply drum 420, thereby continuously forming the scorched rice 20. Accordingly, in the present invention, the scorched rice can be rapidly manufactured in large quantities through an automated and continuous process, and an almost unmanned operation can be realized. An exemplary embodiment for each component will be described as follows.

[1] Ingredient Supply Unit (100)

The ingredient supply unit 100 is not particularly limited as long as it can supply the scorched rice ingredient 10 to the scorched rice formation unit 200. According to one embodiment, the ingredient supply unit 100 may include a hopper 120 in which the scorched rice ingredient 10 is accommodated, and an ingredient conveying means 140 for continuously supplying the scorched rice ingredient 10 accommodated in the hopper 120 to the surface of the scorched rice formation unit 200.

The ingredient conveying means 140 may include, for example, a conveyor belt 144 or a screw. Referring to FIG. 1, the conveying means 140 may include upper/lower rotating rolls 142 installed in the hopper 120 and a conveyor belt 144 rotating along the upper/lower rotating rolls 142. Here, the rotating rolls 142 may be rotated by a motor (not shown) installed at one side. In addition, a plurality of protrusions (not shown) for pushing the scorched rice ingredient 10 downward may be formed on the conveyor belt 144.

In the present invention, the scorched rice ingredient 10 is not particularly limited. The scorched rice ingredient 10 may be selected from various food ingredients in consideration of the taste, nutrition, and/or consumer preference of the scorched rice 20. The scorched rice ingredient 10 may be selected from cooked grains including, for example, rice, soybeans, barley, mung beans, sesame, nuts and/or mixtures thereof (mixed grains) including, for example, white rice for the production of scorched rice. In addition, the scorched rice ingredient 10 may further include, in addition to grains, a medicinal ingredient including an extract such as a vitamin or mineral, a medicinal ingredient or a mushroom extract, and/or a seasoning ingredient such as salt or sugar. The scorched rice ingredient 10 is supplied to the scorched rice formation unit 200 through an outlet formed on the lower side of the hopper 120.

[2] Scorched Rice Formation Unit (200)

In the scorched rice formation unit 200, the scorched rice ingredient 10 supplied from the ingredient supply unit 100 is adhered to form the scorched rice 20. According to a preferred embodiment of the present invention, the scorched rice formation unit 200 is constituted by a belt-shaped endless band 210, which is continuously rotated in the manufacturing process of the scorched rice 20.

As shown in FIG. 1, the endless band 210 is continuously rotated along the heat supply drum 420 and the first roller 610. The endless band 210 may have thermal conductivity and suitable elasticity and strength so as to be continuously rotated along the heat supply drum 420 and the first roller 610. The endless band 210 may be selected from a metal material, for example, consisting of iron (Fe), chromium (Cr), niche (Ni), titanium (Ti), aluminum (Al), and alloys thereof. The endless band 210 may be made of, for example, stainless steel or carbon steel.

In addition, the endless band 210 is made of stainless steel or carbon steel, and may have a width of, for example, 100 mm to 300 mm. In addition, in consideration of flexibility in which the endless band 210 can be continuously rotated along the heat supply drum 420 and the first roller 610, the endless band 210 has a thickness of, for example, 5 mm or less. The endless band 210 may have, for example, a thickness of 0.2 mm to 5 mm, but is not limited thereto.

According to a preferred embodiment of the present invention, the endless band 210 preferably has a fine surface roughness. Specifically, the endless band 210 preferably has a surface roughness (Ra) of 0.1 μm to 2.0 μm. In the present invention, the surface roughness (Ra) is an arithmetic mean surface roughness value (Ra) measured according to a general method in the metal or film related field.

The surface roughness may be formed on the surface of the endless band 210 through, for example, polishing such as a hair line processing. The surface roughness may be formed on one surface or both upper and lower surfaces of the endless band 210. When the surface roughness, that is, the surface roughness Ra is 0.1 μm to 2.0 μm, the manufacturing process of at least the scorched rice 20 can be improved. For example, if the surface roughness (Ra) is less than 0.1 μm, the scorched rice ingredient 10 or the scorched rice 20 may not adhere well to the surface of the endless band 210. In addition, if the surface roughness (Ra) is less than 2.0 μm, after the scorched rice 20 is removed, a lot of residues may remain on the surface of the endless band 210. Therefore, when the surface roughness (Ra) is 0.1 μm to 2.0 μm, the scorched rice ingredient 10 adheres well to the surface of the endless band 210 and does not leave residues, which is advantageous for the manufacture of the scorched rice 20. In consideration of this, the endless band 210 may have a surface roughness Ra of 0.1 μm to 1.2 μm and, more specifically, the endless band 210 may have a surface roughness Ra of 0.3 μm to 0.7 μm.

The scorched rice formation unit 200, that is, the endless band 210, is supplied with the scorched rice ingredient 10, and is then rotated along the heat supply drum 420. At this time, the scorched rice ingredient 10 is carbonized by the heat supplied from the heat supply drum 420 on the surface of the endless band 210 to form the scorched rice 20.

In addition, referring to FIG. 1, the manufacturing apparatus according to the present invention may further include a scraper 250 for controlling the thickness of the scorched rice ingredient 10 supplied onto the scorched rice formation unit 200. The scraper 250 may scrape the scorched rice ingredient 10 discharged from the hopper 120, so that the scorched rice ingredient 10 stacked on the endless band 210 can be maintained at a constant thickness.

The scraper 250 may be installed, for example, at a lower end of one side of the hopper 120 and may be located above the heat transfer unit 300. In addition, the scraper 250 may be made of a metal material or a plastic material, and any material is preferred as long as it can scrape the scorched rice ingredient 10 to a certain thickness. The scorched rice 20 having a uniform thickness may be formed by using the scraper 250.

[3] Heat Transfer Unit (300)

The heat transfer unit 300 applies a predetermined amount of heat to the scorched rice formation unit 200 to allow the scorched rice ingredient 10 to be adhered to the scorched rice formation unit 200. Specifically, the heat transfer unit 300 applies heat to the lower surface of the endless band 210 to provide a predetermined adhesion between the endless band 210 and the scorched rice ingredient 10. Referring to FIG. 1, the heat transfer unit 300 is installed between the heat supply unit 400 and the first roller 610. The endless band 210 is rotated in close contact with the heat transfer unit 300.

According to the present invention, the scorched rice ingredient 10 is supplied and stacked on the surface of the endless band 210, and once heat is applied to the endless band 210 through the heat transfer unit 300, the scorched rice ingredient 10 is adhered to the surface of the endless band 210. Accordingly, the scorched rice ingredient 10 can be continuously supplied through rotation toward the heat supply drum 420 without flowing down or separating.

The heat transfer unit 300 may include a heat transfer plate 310 installed under the ingredient supply unit 100 and a heating means (not shown) for heating the heat transfer plate 310. As shown in FIG. 1, the heat transfer plate 310 is installed at a predetermined interval below the hopper 120. Here, the endless band 210 rotates while passing between the heat transfer plate 310 and the hopper 120, and receives the scorched rice ingredient 10 from the hopper 120 and receives heat from the heat transfer plate 310.

According to one embodiment, the heat transfer plate 310 is made of a plate-shaped metal material, and the heating means may include a heating wire, a heating coil, and/or a band heater. In addition, the heat transfer unit 300 may apply heat of, for example, 50° C. or higher, to the endless band 210. Here, if the heat applied from the heat transfer unit 300 is too low, the adhesion of the scorched rice ingredient 10 may be insignificant, and if the heat applied from the heat transfer unit 300 is too high, rapid carbonization may proceed at the contact interface. In consideration of the foregoing, the heat transfer unit 300 preferably applies heat of 60° C. to 170° C. to the endless band 210.

[4] Heat Supply Unit (400)

The heat supply unit 400 supplies heat to the scorched rice formation unit 200 to form the scorched rice 20. In detail, the heat supply unit 400 supplies predetermined heat to the endless band 210 to form the scorched rice 20 on the surface of the endless band 210.

The heat supply unit 400 is preferably able to supply enough heat to the scorched rice formation unit 200 so as to form the scorched rice 20. That is, heat of 110° C. to 250° C. for example, is preferably supplied to the endless band 210. When the scorched rice 20 is produced by the heat of such a temperature, the produced scorched rice 20 has good releasability, a savory taste and high quality while maintaining an appropriate degree of carbonization. Here, when the heat applied from the heat supply unit 400 is less than 110° C., the carbonization degree is low, so that the savory taste is reduced, and the releasability may be lowered when the scorched rice 20 is separated by the separation unit 500 later. In addition, when the heat applied from the heat supply unit 400 exceeds 250° C., the carbonization degree is too high, and thus a great deal soot may be generated and the quality may be deteriorated. Given this, the heat supply unit 400 preferably supplies heat of 150° C. to 220° C. to the endless band 210.

According to a preferred embodiment of the present invention, the heat supply unit 400 has a cylindrical drum type. Specifically, the heat supply unit 400 includes a heat supply drum 420 in the form of a drum in which a heating element 425 is installed. The heat supply drum 420 is, for example, a drum-type rotating body having a diameter of 1.5 m or more, for example, 1.5 m to 5 m, in which the heating element 425 for supplying heat is installed on its surface layer.

According to one embodiment, the heat supply unit 400 may be shaped of a drum including an inner rotary drum 410 and an outer heat supply drum 420 coupled to the outer circumference of the rotary drum 410. Here, the heat supply drum 420 is rotated in the same rotational direction and rotational speed as the rotating drum 410. In addition, the endless band 210 is rotated in the same rotational direction and speed as the heat supply drum 420 in a state in which it is in close contact with the outer surface of the heat supply drum 420.

Referring to FIG. 2, the rotating drum 410 may include a rotating shaft 412 and a cylindrical rotating cylinder 414 coupled to the rotating shaft 412 and rotated. Here, the rotating shaft 412 is connected to a driving means (not shown) such as a motor to receive rotational power. In addition, the rotating cylinder 414 is made of a metal material, which is coupled to the heat supply drum 420 through a fastener 430 (see FIG. 3) or welding.

The heat supply drum 420 is cylindrical, and supplies the endless band 210 with adequate heat for the production of the scorched rice 20. The heat supply drum 420 includes a heating element 425 for applying heat. Here, the heating element 425 is not particularly limited as long as it can apply heat, and may be selected from, for example, a heating wire, a heating coil, a band heater, a surface heating element, and/or other resistance heating elements. In addition, the installation structure of the heating element 425 is not particularly limited, and the heating element 425 may be installed on the surface of and/or inside the heat supply drum 420.

According to one embodiment, the heat supply drum 420 has a multi-layered structure for achieving good heat transfer and preventing a temperature deviation. FIG. 3 shows a heat supply drum 420 according to a first embodiment of the present invention, and FIG. 4 shows a heat supply drum 420 according to a second embodiment of the present invention.

First, referring to FIG. 3, the heat supply drum 420 has a multilayer structure, and may include a thermally conductive skin layer 421 with which the endless band 210 is in close contact, and a thermal diffusion layer 422 formed on the skin layer 421. In addition, the heat supply drum 420 may further include a support layer 424 formed on the thermal barrier layer 423.

The skin layer 421 is made of a metal material, which is in contact with the back surface of the endless band 210. The skin layer 421 may be formed of, for example, iron (Fe), aluminum (Al), zinc (Zn), tin (Sn), copper (Cu), or an alloy thereof. In addition, the skin layer 421 may have a thickness of, for example, 5 to 20 mm. The endless band 210 is in close contact with the surface of the skin layer 421 and is continuously rotated while receiving heat.

The thermal diffusion layer 422 is in close contact with and coupled to the skin layer 421 and has a heating element 425 formed therein. Specifically, the heating element 425, such as a heating wire, is embedded into the thermal diffusion layer 422 at a predetermined interval. The thermal diffusion layer 422 diffuses the heat of the heating element 425 and evenly transmits the heat to the skin layer 421.

The thermal diffusion layer 422 may be made of a metal material, which may be selected from a metal material having high thermal conductivity. The thermal diffusion layer 422 may be formed of, for example, copper (Cu), iron (Fe), aluminum (Al), zinc (Zn), tin (Sn), or an alloy thereof. In consideration of thermal conductivity (thermal diffusivity), the thermal diffusion layer 422 may be selected from copper (Cu) and alloys thereof, for example, brass (Cu—Zn) or copper-iron (Cu—Fe) alloy. and so on. In addition, the thermal diffusion layer 422 may have a thickness of, for example, 10 to 30 mm.

The heating element 425 may supply heat of 110° C. to 250° C. to the endless band 210. As described above, when heat in the above temperature range is supplied to the endless band 210, the scorched rice 20 having good releasability while maintaining an appropriate degree of carbonization, a savory taste and high quality can be generated. Heat supplied (dissipated) from the heating element 425 is diffused in the thermal diffusion layer 422, then transferred to the skin layer 421 and supplied to the endless band 210.

In addition, according to one embodiment, the heating element 425 may supply heat generated by electrical resistance to the endless band 210. Here, the heating element 425 may receive electricity from an electricity supply unit (not shown). The electricity supply unit is selected from a battery installed in the rotating cylinder 414, or selected from a rotating-body-electricity-supply device for supplying external power to the rotating cylinder 414.

The rotating-body-electricity-supply device is used in general industrial fields, and, for example, a brush-type electricity supply device capable of supplying electricity to the heating element 425 of the rotating heat supply drum 420 may be used, but not limited thereto. The brush-type electricity supply device may have a structure including, for example, a rotating brush installed on a rotating shaft of the heat supply drum 420, and an electricity supply unit that is in contact with the rotating brush to continuously supply electricity. Since such a brush-type electricity supply device has the same configuration as used in general industrial fields, a detailed description thereof will be omitted.

Meanwhile, in the present invention, the skin layer 421 and the thermal diffusion layer 422 are technically significant in that they can prevent temperature deviation. In supplying heat to the endless band 210, it is preferable that the heat be uniformly supplied over the entire surface of the endless band 210.

Referring to FIGS. 1 and 3, the endless band 210 is in close contact with the heat supply drum 420 and rotates at the same rotation speed as the rotation speed of the heat supply drum 420. Here, the heating elements 425 such as heating wires are formed (arranged) at predetermined intervals in the heat supply drum 420 to locally supply heat to the endless band 210. However, if there is no skin layer 421 or thermal diffusion layer 422, a temperature deviation may occur between a portion close to the heating element 425 (indicated by P1 in FIG. 3) and a portion distant from the heating element 425 (indicated by P2 in FIG. 3). That is, the temperatures of the portion P1 and the portion P2 of FIG. 3 are not the same, and P1 may be higher than that of P2. Due to such a temperature deviation, for example, the scorched rice 20 produced in the P1 portion of FIG. 3 has an extremely high degree of carbonization, and the scorched rice 20 produced in the P2 portion of FIG. 3 has a weak degree of carbonization or may be difficult to be produced.

According to the embodiment of the present invention, the skin layer 421 and the thermal diffusion layer 422 can solve the above problems. Specifically, as shown in FIG. 3, even when the heating elements 425 such as heating wires are formed at predetermined intervals in the thermal diffusion layer 422 to supply local heat, the heat of the heating elements 425 is transferred and spread from the thermal diffusion layer 422. Thereafter, thermal equilibrium is achieved in the skin layer 421 due to the thermal conductivity of the skin layer 421 and transferred to the endless band 210. Accordingly, uniform heat is supplied to the endless band 210 over the entire surface without temperature deviation. That is, the temperature deviation between the portion P1 and the portion P2 in FIG. 3 is prevented. The skin layer 421 and the thermal diffusion layer 422 are technically significant in that such a temperature deviation can be prevented.

In addition, the thermal barrier layer 423 is in close contact with and coupled to the thermal diffusion layer 422, which blocks heat from the thermal diffusion layer 422 and thus prevents heat loss. The thermal barrier layer 423 prevents heat loss and efficiently prevents the temperature deviation between the portion P1 and the portion P2.

The thermal barrier layer 423 may be selected from a material having thermal and/or thermal insulation properties. The thermal barrier layer 423 may be selected from, for example, a plastic material, a ceramic material, and/or a fiber material.

The thermal barrier layer 423 may be selected from a material having heat resistance and heat insulation, and specific examples thereof may be selected from fluorine-based resin or glass fiber, but is not limited thereto. Here, the fluorine-based material constituting the thermal barrier layer 423 may be selected from a material having a melting point of 250° C. or higher including, for example, polyvinylidene fluoride (PVDF), polytetrafluoroethylene (PTFE), fluorinated ethylene propylene (FEP) and/or perfluoroalkoxy (PFA) polymers and the like. In addition, the thermal barrier layer 423 may be selected from rock wool (rock wool), glass wool, and/or compressed asbestos. In addition, the thermal barrier layer 423 may have a thickness of, for example, 5 to 20 mm.

The support layer 424 is in close contact with and coupled to the thermal barrier layer 423, which supports the thermal barrier layer 423 and reinforces bonding strength. The support layer 424 may be selected from, for example, a hard plastic material and/or a metal material. The support layer 424 has high strength and heat resistance, and may be selected from, for example, fiber-reinforced plastic (FRP), epoxy resin, polyamide and/or polyimide, etc., but not limited thereto. The support layer 424 may have a thickness of, for example, 5 to 20 mm.

Referring to FIG. 3, the heat supply drum 420 having the multi-layer structure may have a fastener 430 passing therethrough under the support layer 424 to be coupled thereto. That is, the skin layer 421, the thermal diffusion layer 422, the thermal barrier layer 423, and the support layer 424 may be coupled to each other by means of the fastener 430. In addition, as shown in FIG. 3, the fastener 430 may promote a coupling force between the heat supply drum 420 and the rotating cylinder 414.

As described above, according to the embodiment of the present invention, when the heat supply drum 420 has the multi-layer structure, good heat transfer and temperature deviation can be prevented. Specifically, as described above, the heat of the heating element 425 is diffused by the thermal diffusion layer 422 and blocked/insulated by the thermal barrier layer 423, while the heat is uniformly conducted by the skin layer 421. Accordingly, heat is uniformly transferred to the endless band 210 rotated in close contact with the skin layer 421 over the entire surface without a local temperature deviation. That is, in FIG. 3, the heat transferred from the P1 portion and the P2 portion is almost the same.

According to another embodiment of the present invention, the heat supply drum 420 has a multi-layer structure including a skin layer 421, a thermal diffusion layer 422, a thermal barrier layer 423, and a support layer 424, wherein the thermal barrier layer 423 and the support layer 424 may be intermittently formed.

Specifically, referring to FIG. 4, the thermal barrier layer 423 may not be continuously formed on the thermal diffusion layer 422 but may be intermittently formed with an insulating material 426 interposed therebetween. Here, as shown in FIG. 4, the fastener 430 may pass through the rotating cylinder 414 and then sequentially pass through the support layer 424, the thermal barrier layer 423, and the thermal diffusion layer 422 to be bolted to and coupled to the skin layer 421. In addition, an insulating material 426 may be installed between the rotating cylinder 414 and the thermal diffusion layer 422.

In addition, the thermal barrier layer 423 may be formed of a heat-resistant plastic material such as fluorine-based resin, and the support layer 424 may be formed of a high-strength plastic material such as fiber-reinforced plastic (FRP). In addition, the insulating material 426 may be selected from synthetic resin foam, fiber material, rock wool (rock wool), glass wool and/or compressed asbestos.

According to another embodiment of the present invention, the heat supply drum 420 may be shaped of a drum including a plurality of heat supply modules 420M. Specifically, the heat supply drum 420 may have a plurality of heat supply modules 420M circularly disposed along the outer periphery of the rotating cylinder 414, and the plurality of heat supply modules 420M can be assembled and configured through a fastener 430 on the rotating cylinder 414.

In addition, the heat supply module 420M has a multi-layer structure as described above. Specifically, each heat supply module 420M has a multi-layer structure as shown in FIGS. 3 and 4, including the skin layer 421, the thermal diffusion layer 422, the thermal barrier layer 423, and the support layer 424, while having a structure in which a heating element 425 is embedded.

When the heat supply drum 420 is composed of a plurality of heat supply modules 420M as described above, for example, maintenance and device manufacturing can be advantageously achieved. For example, when the heat supply drum 420 is malfunctioning or aging, any one heat supply module 420M requiring replacement/repair may be target for maintenance without wholly replacing/repairing heat supply drum 420. In addition, by reducing or extending the number of heat supply modules 420M, the apparatus can be freely manufactured in a small or large size, so that the apparatus can be appropriately adjusted according to an installation space.

In addition, a contact interface between the respective layers 421, 422, 423, and 424 constituting the heat supply drum 420 may have a concave-convex structure. Specifically, the contact interface between the skin layer 421 and the thermal diffusion layer 422, the contact interface between the thermal diffusion layer 422 and the thermal barrier layer 423, and/or the contact interface between the thermal barrier layer 423 and the support layer 424 may have a concave-convex structure. Due to the concave-convex structure, heat conduction and/or bonding force between the respective layers 421, 422, 423, and 424 may be improved.

[5] Scorched Rice Separation Unit (500)

The scorched rice separation unit 500 separates the scorched rice 20 formed in the scorched rice formation unit 200. Referring to FIGS. 1 and 5, according to one embodiment, the scorched rice separation unit 500 may include a blade 510 which is inserted between the scorched rice formation unit 200 and the scorched rice 20 and allows the scorched rice 20 to be separated and removed from the scorched rice formation unit 200. Specifically, the scorched rice separation unit 500 includes the blade 510 for peeling off the scorched rice 20 formed on the surface of the endless band 210, and a blade edge inserted between the endless band 210 and the scorched rice 20 to peel off the scorched rice 20 may be formed at the end of the blade 510.

In addition, the scorched rice separation unit 500 may include a cutter 520 for cutting the separated scorched rice 20 into a predetermined size, and a collection unit 530 for collecting the scorched rice 20 cut through the cutter 520. Here, the collection unit 530 may collect scorched rice in a stacking form or in a roll form.

Referring to FIG. 1, according to one embodiment, the collection unit 530 may stack the scorched rice 20 cut to a predetermined size through the cutter 520 in a box 532 and may collect the same in a stacking form.

In addition, referring to FIG. 5, according to another embodiment, the collection unit 530 may collect the cut scorched rice 20 in a roll form in the box 532. Here, the collection unit 530 may include a chuck winder 534 for rolling the scorched rice 20 in a roll form.

As shown in FIG. 5, the chuck winder 534 may be in close contact with both upper and lower surfaces of the scorched rice 20 to hold the scorched rice 20, and may then roll the scorched rice 20 through rotation. Then, the scorched rice 20 may be rolled through the chuck winder 534 at an appropriate number of revolutions, and then cut through the cutter 520, and then stored in the box 532 and collected.

[6] Other Components

As described above, according to the present invention, the endless band 210 is in close contact with the surface of the heat supply drum 420 and the first roller 610 to form the scorched rice 20 while continuously rotating.

Here, the first roller 610 may be installed at one side (in FIG. 1, the right side) of the ingredient supply unit 100. The first roller 610 has a horizontality maintaining function of enabling the endless band 210 that passes through the lower side of the ingredient supply unit 100 to be maintained horizontally and a function of enabling the continuous rotation of the endless band 210.

Specifically, referring to FIG. 1, the heat supply drum 420 is installed on the left side of the ingredient supply unit 100, the heat transfer unit 300 is installed on the lower side of the ingredient supply unit 100, and the first roller 610 is installed on the right side of the ingredient supply unit 100. In addition, the heat supply drum 420, the heat transfer unit 300 and the first roller 610 are maintained horizontally. That is, the upper side of the heat supply drum 420, the surface of the heat transfer unit 300, and the upper side of the first roller 610 are located on the same horizontal line.

Accordingly, the endless band 210 maintains horizontality between the heat supply drum 420 and the first roller 610. That is, the endless band 210 is maintained horizontally on the heat transfer unit 300 while continuously being supplied with scorched rice ingredient 10 from the ingredient supply unit 100 to produce the scorched rice 20 while continuously rotating along the surface of the heat supply drum 420 and the first roller 610.

In addition, the scorched rice manufacturing apparatus according to the present invention may further include a second roller 620 in addition to the first roller 610. For example, at least one second roller 620 may be installed between the scorched rice separation unit 500 and the first roller 610. Here, the second roller 620 may have a function of guiding the endless band 210 that has passed through the scorched rice separation unit 500 toward the first roller 610.

Referring to FIG. 5, the scorched rice manufacturing apparatus according to the present invention may further include a residue removal unit 700. The residue removal unit 700 may be installed between the scorched rice separation unit 500 and the first roller 610. The residue removal unit 700 is not particularly limited as long as it can remove the residues remaining on the surface of the scorched rice formation unit 200 after the scorched rice 20 is separated in the scorched rice separation unit 500.

Specifically, the residue removal unit 700 may remove residues (foreign substances such as carbides) remaining on the surface of the endless band 210 after removal of the scorched rice 20. The residue removal unit 700 may include, for example, a grinder 650, etc.

In addition, according to an aspect, the scorched rice manufacturing apparatus according to the present invention includes at least one grinder 650, wherein the grinder 650 performs a residue removal function and a surface roughness forming function, and may perform at least two or more functions. Specifically, the grinder 650 may have a function to remove the residues remaining on the surface of the belt-shaped endless band 210 after the scorched rice 20 is separated in the scorched rice separation unit 500, or to form the roughness on the surface of the belt-shaped endless band 210. One or more grinders 650 may be installed between the scorched rice separation unit 500 and the first roller 610 and, more specifically, one or more grinders 650 may be installed between the second roller 620 and the first roller 610.

Referring to FIG. 5, the grinder 650 may include a rotating roller 652 and a brush 654 formed on a surface of the rotating roller 652. Removal of residues and/or formation of surface roughness may be performed by rotation of the brush 654. According to other embodiments, the brush 654 may be replaceable. Specifically, the brush 654 may be selected from a deburring brush for removing residues or a hair line brush for forming surface roughness, as necessary. In addition, in some cases, the brush 654 may be detachable (combined and separated) from the rotating roller 652, and thus can be freely replaced and used.

In addition, referring to FIG. 5, the scorched rice manufacturing apparatus according to the present invention may further include a tension adjusting unit 800 for adjusting the tension of the endless band 210. The tension adjusting unit 800 may be installed, for example, on the first roller 610. Referring to FIG. 5, the tension adjusting unit 800 may include a tension adjusting groove 811 into which the shaft 611 of the first roller 610 is inserted. The shaft 611 of the first roller 610 may slide in the longitudinal direction (in the left and right directions in FIG. 5) of the tension adjusting groove 811, and after the tension of the endless band 210 is adjusted by the sliding can be fixed.

Additionally, referring to FIGS. 5 and 6, the scorched rice manufacturing apparatus according to the present invention may further include a separation preventing unit 900 for preventing separation of the endless band 210 The separation preventing unit 900 is not particularly limited as long as it can prevent the endless band 210 from being separated from the heat supply drum 420 and the first roller 610 in the course of rotating along the heat supply drum 420 and the first roller 610.

As shown in FIG. 6, the separation preventing unit 900 may include a stopper 910 spaced apart from the side of the endless band 210. The stopper 910 may be installed on only one side of the endless band 210 or installed on both sides of the endless band 210. In addition, the separation preventing unit 900 may include a bearing 920 with which the side surface of the endless band 210 is in contact. Due to the rolling action of the bearing 920, even if the endless band 210 is in contact therewith, smooth rotation of the endless band 210 may proceed. Here, an insertion groove 912 is formed at one side of the stopper 910, and the bearing 920 may be installed in the insertion groove 912.

The separation prevention unit 900 may be installed between the ingredient supply unit 100 and the first roller 610, or may be installed on the heat supply unit 400, but the installation location and the number of separation prevention units 900 installed are not limited. In addition, the separation preventing unit 900 may include a connection frame 930 coupled to the stopper 910. The connection frame 930 may be fixed to the ground or the ceiling, for example. As another example, when the stopper 910 constituting the separation preventing unit 900 is installed on the heat supply unit 400, the connection frame 930 may be fixed to the heat supply drum 420 or the rotating drum 410.

Additionally, the scorched rice manufacturing apparatus according to the present invention may further include a control unit (not shown), and the rotation speed of the endless band 210 and the temperature (heat) supplied to the endless band 210 may be controlled by the control unit. Specifically, the control unit may control the rotational speed of the rotating drum 410 and may appropriately control the temperature (heat) of the heat transfer unit 300 and the heat supply drum 420.

In addition, the scorched rice manufacturing apparatus according to the present invention may further include the scorched rice manufacturing apparatus according to the present invention may further include a drying unit (not shown). The drying unit is for drying the scorched rice 20 separated by the scorched rice separation unit 500, which may be dried to prevent mold, etc. from being formed on the scorched rice 20. The drying unit may dry the scorched rice 20 separated by the scorched rice separation unit 500 by, for example, hot air.

As described above, according to the present invention, scorched rice can be manufactured in an automatic and continuous process, thereby enabling rapid mass production of the scorched rice and reducing labor costs, and the like, by implementing an almost unmanned operation. Accordingly, the scorched rice 20 can be supplied to consumers at a low price.

Above all, according to the present invention, the belt-shaped endless band 210 in which scorched rice 20 is produced has a compact configuration in which the drum-type heat supply drum 420 is continuously rotated. Specifically, by deviating from (improving) the conventional conveyor-type structure, the present invention is configured to provide the belt-shaped endless band 210 and the drum-type heat supply drum 420, and is technically significant in that the drum-type heat supply drum 420 is continuously rotated by the belt-shaped endless band 210. Therefore, according to the present invention, the productivity is improved compared to the case of using a conventional conveyor-type mold (heating plate), and the installation space and maintenance cost of the apparatus may be reduced due to a compact configuration.

Additionally, according to the present invention, when the heat supply drum 420 has a multi-layered structure including the skin layer 421, the thermal diffusion layer 422 and the thermal barrier layer 423, a temperature deviation is prevented as described above. That is, in FIGS. 3 and 4, a temperature deviation between the P1 portion and the P2 portion is prevented (minimized). Accordingly, uniform heat is supplied over the entire surface of the endless band 210, thereby efficiently manufacturing high-quality scorched rice having a savory taste.

The invention claimed is:
1. An apparatus for manufacturing scorched rice, the apparatus comprising:
   an ingredient supply unit for supplying a scorched rice ingredient;
   a scorched rice formation unit which forms scorched rice and to which the scorched rice ingredient supplied from the ingredient supply unit is adhered;
   a heat supply unit for supplying heat to the scorched rice formation unit so that the scorched rice is formed;
   a scorched rice separation unit for separating the scorched rice formed by the scorched rice formation unit;
   a scraper for controlling the thickness of the scorched rice ingredient supplied to the scorched rice formation unit; and a residue removal unit for removing residues remaining on the surface of the scorched rice formation unit after the scorched rice is separated in the scorched rice separation unit,
wherein the scorched rice separation unit comprises a blade inserted between the scorched rice formation unit and the scorched rice, and allowing the scorched rice to be separated and removed from the scorched rice formation unit, and
wherein the scorched rice formation unit is rotated.

2. The apparatus of claim 1,
wherein the scorched rice formation unit includes a belt-shaped endless band, the heat supply unit includes a drum-type heat supply drum on which a heating element is installed, and the belt-shaped endless band is continuously rotated along the heat supply drum.

3. The apparatus of claim 1, further comprising
a first roller installed on one side of the ingredient supply unit, the scorched rice formation unit includes a belt-shaped endless band, the heat supply unit includes a drum-type heat supply drum on which a heating element is installed, and the belt-shaped endless band is continuously rotated along the heat supply drum and the first roller.

4. The apparatus of claim 3, further comprising
a heat transfer unit that applies heat to the scorched rice formation unit to allow the scorched rice ingredient to be adhered to the scorched rice formation unit by applying heat to the scorched rice formation unit, wherein a heat supply drum is installed on the left side of the ingredient supply unit, the heat transfer unit is installed on the lower side of the ingredient supply unit, and a first roller is installed on the right side of the ingredient supply unit, while the upper side of the heat supply drum, the surface of the heat transfer unit, and the upper side of the first roller are maintained in a horizontal position, and the belt-shaped endless band is maintained in a horizontal position on the heat transfer unit to continuously receive the scorched rice ingredient from the ingredient supply unit and is continuously rotated along the heat supply drum and the first roller.

5. The apparatus of claim 2,
wherein the heat supply drum comprises:
a thermally conductive skin layer with which the belt-shaped endless band is in close contact;
a thermal diffusion layer formed on the skin layer;
a thermal barrier layer formed on the thermal diffusion layer; and
and a heating element embedded in the thermal diffusion layer.

6. The apparatus of claim 2,
wherein the heat supply drum comprises a plurality of heat supply modules, and each of the heat supply modules comprises: a thermally conductive skin layer with which the belt-shaped endless band is in close contact; a thermal diffusion layer formed on the skin layer; a thermal barrier layer formed on the thermal diffusion layer; a support layer formed on the thermal barrier layer; and a heating element embedded in the thermal diffusion layer.

7. The apparatus of claim 2, further comprising
a grinder, wherein the grinder comprises a rotating roller and a brush formed on the rotating roller, and the grinder removes the residues remaining on the surface of the belt-shaped endless band after the scorched rice is separated in the scorched rice separation unit, or forms the roughness on the surface of the belt-shaped endless band.

8. The apparatus of claim 1,
wherein the scorched rice formation unit includes a belt-shaped endless band, and the belt-shaped endless band has a surface roughness of 0.1 μm to 2.0 μm.

\* \* \* \* \*